United States Patent
Zhu

(10) Patent No.: US 7,454,192 B1
(45) Date of Patent: Nov. 18, 2008

(54) POSTAL ADDRESS VALIDATION USING MOBILE TELEPHONE LOCATION INFORMATION

(75) Inventor: Kevin Zhu, Overland Park, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 33 days.

(21) Appl. No.: 11/051,351

(22) Filed: Feb. 4, 2005

(51) Int. Cl.
*H04M 11/00* (2006.01)
*H04M 15/00* (2006.01)
*G06F 15/02* (2006.01)
*H04Q 7/20* (2006.01)

(52) U.S. Cl. .................. 455/406; 708/110; 379/114.28; 455/456.1; 455/457

(58) Field of Classification Search ................. 370/335, 370/328, 336; 455/456.1, 423, 67.11, 435.1, 455/432.1, 456.2, 456.3, 456.4, 456.5, 456.6, 455/406; 340/988–996; 708/110; 379/114.28, 379/114.29
See application file for complete search history.

(56) References Cited

U.S. PATENT DOCUMENTS

| | | | | |
|---|---|---|---|---|
| 5,966,650 | A * | 10/1999 | Hobson et al. | 455/410 |
| 6,768,910 | B2 * | 7/2004 | Gutowski et al. | 455/456.1 |
| 6,847,824 | B1 * | 1/2005 | Contractor | 455/456.1 |
| 6,879,836 | B2 * | 4/2005 | Nakamoto et al. | 455/456.2 |
| 2005/0003835 | A1 * | 1/2005 | Riise et al. | 455/456.3 |
| 2005/0009499 | A1 * | 1/2005 | Koster | 455/406 |

* cited by examiner

*Primary Examiner*—Nick Corsaro
*Assistant Examiner*—Shannon R Brooks

(57) ABSTRACT

A system is provided for postal address validation using mobile device location data. The system includes a location system operable to determine mobile device location information. The system also includes an address validation system operable responsive to identifying an incorrect billing address for a customer to determine a new postal address for billing the customer based on the mobile device location information. A method is provided for determining a postal address using location data for a mobile device.

20 Claims, 3 Drawing Sheets

POSTAL ADDRESS VALIDATION USING MOBILE TELEPHONE LOCATION INFORMATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure relates to the validation of postal addresses. More specifically, but not by way of limitation, a method and a system are provided that use mobile telephone location data to determine a postal address to which a bill can be sent.

BACKGROUND OF THE INVENTION

An organization that sends bills to customers by mail might have a portion of the bills returned each billing cycle because of incorrect customer addresses. The addresses may be incorrect because a customer moved and did not provide a forwarding address, because a data entry error occurred when a customer address was originally recorded, because a customer deliberately provided an incorrect address to avoid payment of bills, or for other reasons. Incorrect billing addresses can create a substantial financial burden since the organization not only does not receive the payment it is due in a timely manner, it also typically spends time and money attempting to determine a correct billing address.

SUMMARY OF THE INVENTION

In one embodiment, the present disclosure provides a system for postal address validation using mobile device location data. The system includes a location system operable to determine mobile device location information. The system also includes an address validation system operable responsive to identifying an incorrect billing address for a customer to determine a new postal address for billing the customer based on the mobile device location information.

In another embodiment, a method is provided for determining a postal address to which a bill is to be sent. The method includes receiving a returned bill for service related to a mobile telephone due to an incorrect postal address. The method includes obtaining location information for the mobile telephone, and determining a likely billing address for a customer of the mobile telephone by identifying a postal address related to the location information obtained for the mobile telephone.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

It should be understood at the outset that although an exemplary implementation of one embodiment of the present invention is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

A telecommunications company that provides mobile telephony services might offer location-based services to its customers. These services can allow features or functions to be customized for a customer based on the location of the customer. For example, a customer might use his telephone to send information about his current location to the mobile telephony provider and the mobile telephony provider might send a map of the customer's vicinity to the customer's telephone. As used herein, the term "telephone" refers to any device with telecommunications capabilities, including devices that provide other functions in addition to telecommunications.

Location-based services typically require that information about the physical locations of the devices used by the customers be available to the mobile telephony provider. The location information might be determined by means of a Global Positioning System (GPS) within a customer's telephone or through some other functionality that might be present within the telephone or enabled by the telecommunications provider's system using well known methods to provide information about the location of the telephone.

In an embodiment, when the address to which a customer's bill is sent is found to be invalid, location based information about the customer's mobile telephone is collected. The location information is analyzed to determine the postal addresses that correspond to the physical locations where the customer's mobile telephone has been identified as being located. Further analysis is performed to determine which of the postal addresses is most likely to be the customer's residence and this address is assumed to be the address to which bills should be sent. If this address is confirmed as the correct billing address for the customer, a database of customer information is updated with the correct address.

Figure 1:
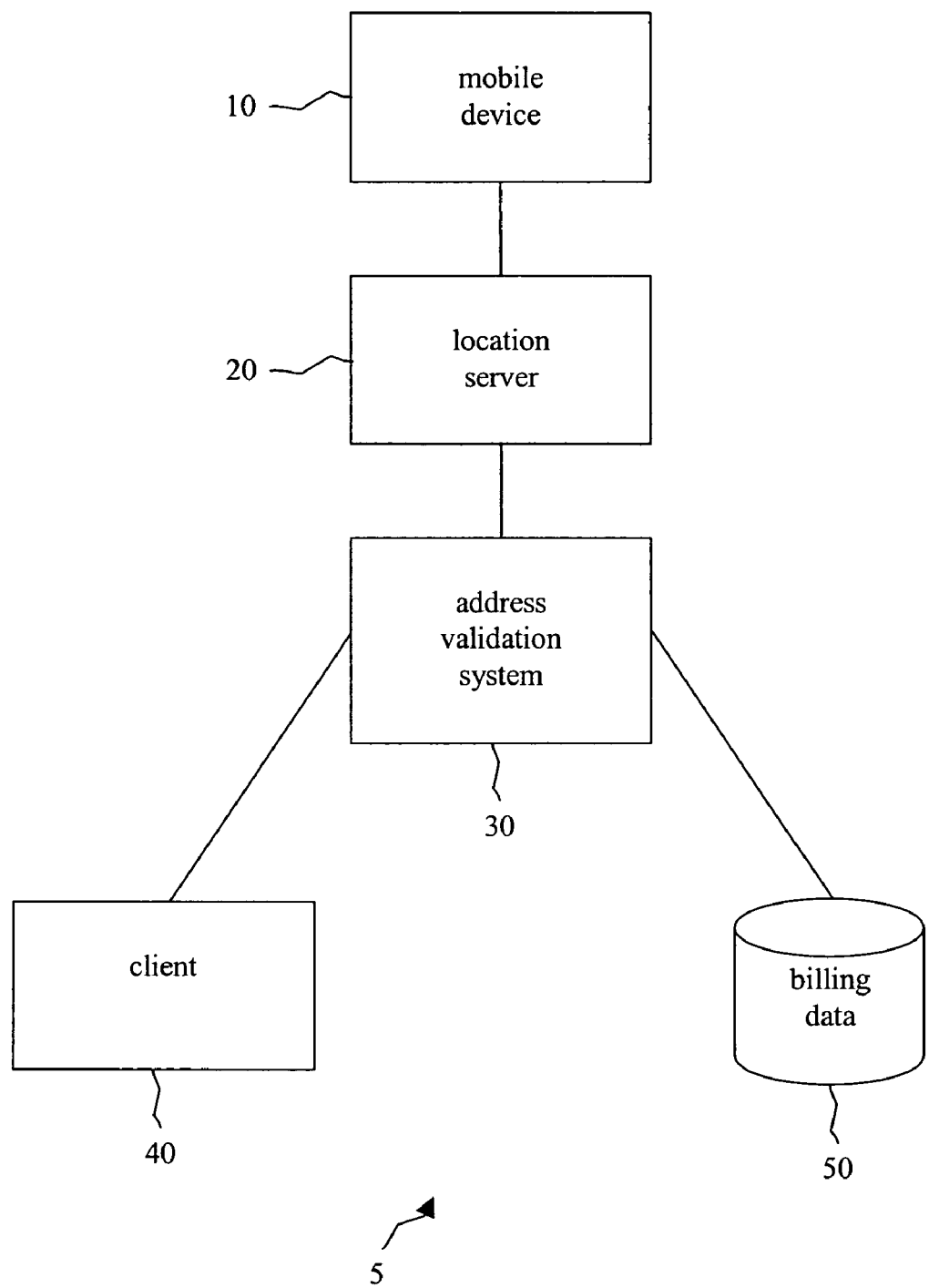
FIG. 1 illustrates a system for validating postal addresses for billing purposes according to an embodiment of the present disclosure.

FIG. 1 illustrates an embodiment of a system 5 that might be used to validate postal addresses for billing purposes. A mobile telephone 10 or similar device contains a GPS or other location based functionality to determine the location of the device 10. A location server 20 managed by a mobile telephony provider receives location information from the mobile device 10. The location information would typically be in the form of latitudes and longitudes or some other geographical coordinates rather than in the form of street addresses.

An address validation system 30 managed by the mobile telephony provider can retrieve location information from the location server 20. Algorithms within the address validation system 30 can correlate information on where a mobile device 10 has been identified as being located with a postal address that corresponds to that location. The algorithms might use multiple information sources to perform the correlation, such as real estate land surveys and deed specifications, real estate tax records, and mapping services. Other information sources that might aid in correlating geographic locations to postal addresses will be apparent to one of skill in the art.

A customer carrying a mobile device 10 might change locations frequently, and each location might correspond to a different postal address. Further analysis can be done to determine which address is most likely to be the residence, and therefore the billing address, of the customer. For example, telephone directories, US Postal Service data, name change data obtained from courts, and other sources might be consulted to confirm a postal address as a customer's residence. For instance, if the algorithms in the address validation system 30 determine that a mobile device 10 tends to be present for extended periods of time at multiple addresses, and further analysis determines that one of the addresses is a residence and the other addresses are businesses, the residence address might be assumed to be the customer's residence.

Additional rules can be defined regarding how location-based information will be collected, which information will be collected, and how the information will be analyzed. For example, location-based information might be collected at a particular time of day, such as the early morning hours, when a person is most likely to be at home. The location-based information might be collected over an extended period of time, such as a week or a month, so that patterns in a person's locations can be more easily discerned. When location-based information is collected over an extended time, samples of the information might be collected only at periodic or random intervals to reduce the amount of data gathered. Another rule might specify that only locations where the mobile device 10 has been more than a specified number of times will be considered in the analysis of the information. These rules are intended only as examples, and other rules for collecting and analyzing location-based information and for correlating that information to postal addresses will be apparent to one of skill in the art.

The above steps do not necessarily need to occur in a particular sequence. For example, a set of geographic locations might first be correlated to a set of postal addresses and then the postal address that is most likely to be the residence of a customer might be determined. Alternatively, a geographic location that is most likely to be the residence of a customer might first be determined and then the geographic location might be correlated to a postal address. Other sequences of steps will be apparent to one of skill in the art.

A computer-based client 40 can be used to define the rules used by the address validation system 30 for collecting and analyzing location-based information. For example, an administrator might use the client 40 to specify the period of time over which information will be collected, the frequency with which information will be collected, the sources to be consulted in the analysis of the information, the analysis methods to be used, and other parameters that might define how geographic locations are to be correlated to postal addresses.

Once an address has been determined to be the most likely billing address for a customer, bills might be sent to both the previously known address and the newly determined address. A note might be included in the bill sent to the newly determined address asking the customer to verify the address. If the customer verifies the address or if the bill sent to the newly determined address is not returned by a postal service, that address may be considered the correct address.

The mobile telephony provider's databases might then be updated with the new address. In particular, the address validation system 30 might store the correct postal address in a database 50 for billing data.

For regulatory and privacy reasons, customers of mobile telephony services typically must opt-in to location-based services. That is, a customer must actively choose to subscribe to a location-based service. A mobile telephony provider cannot automatically provide a location-based service as a default and then require a customer to cancel an unwanted service.

If the billing address for a customer is found to be invalid and the customer has not previously opted-in to a location-based service, the mobile telephony provider can send a voice message or a text message to the customer over the customer's mobile device 10 telling the customer to either provide a valid address or opt-in to a location-based service. If the customer opts-in, information obtained through the location-based service can be used as described above to determine the customer's postal address. If the customer refuses to opt-in or provide updated address information, service for the customer can be suspended or terminated.

Figure 2:
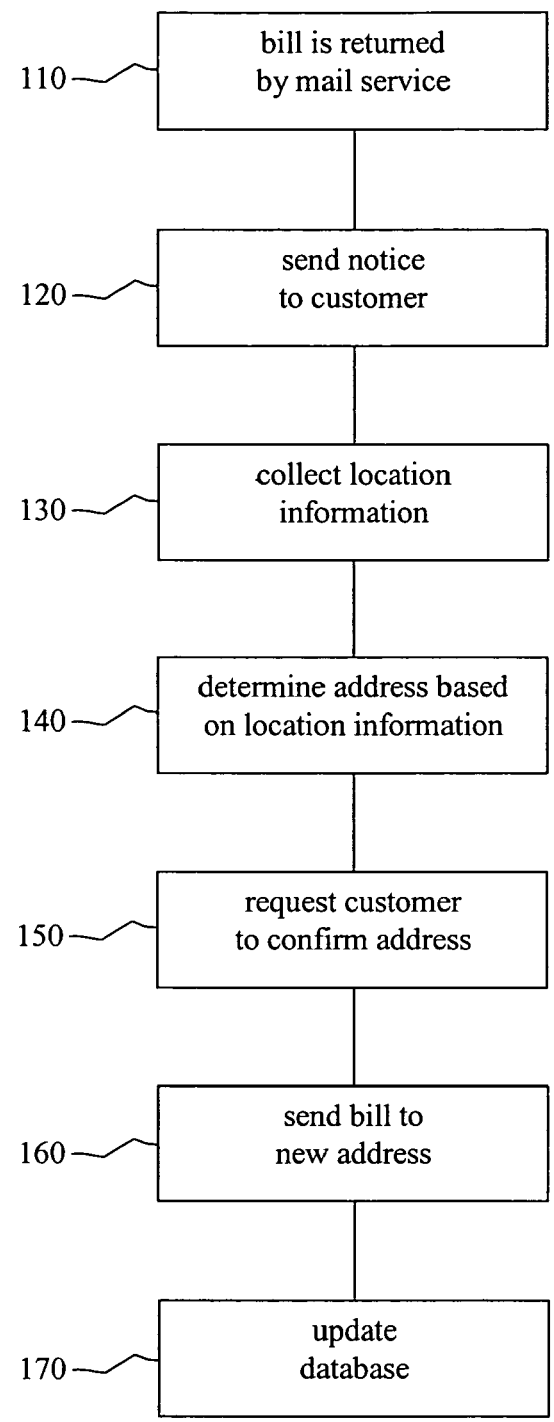
FIG. 2 illustrates a method for validating postal addresses for billing purposes according to an embodiment of the present disclosure.

FIG. 2 illustrates an embodiment of a method for validating postal addresses for billing purposes. The address validation process is typically initiated when a bill to a customer is returned by a postal service due to an incorrect address, as shown in box 110. In box 120, a notice is sent to the customer asking the customer to provide a valid postal address. The notice might be sent to the customer's mobile telephone by voice message or text message. A warning might be included that the customer's service could be suspended if a valid address is not provided.

In box 130, if the customer does not provide a valid postal address, location information pertaining to the customer is collected. A mobile telephony provider that provides location-based services would typically have information readily available regarding the location of a customer's mobile telephone and the customer can be assumed to be in the same location as the mobile telephone.

In box 140, a likely postal address for the customer is determined through an analysis of the location information collected in box 130. Multiple information sources can be consulted to correlate geographic location information to postal addresses. The analysis might determine which one of multiple geographic locations or postal addresses that a customer has visited in a given time period is most likely to be the customer's residence.

In box 150, the customer might be asked to confirm that the newly determined address is correct. The confirmation request might be made by a voice message or a text message sent to the customer's mobile telephone.

In box 160, a bill might be sent to the newly determined address. If the bill is not returned by the postal service, the address might be assumed to be correct. Alternatively, a note might be included in the bill sent to the newly determined address asking the customer to confirm that the billing address is correct and the customer might return the requested confirmation.

In box 170, if the customer has confirmed that the address is correct or if it has been assumed that the address is correct, a database of customer information can be updated with the new address.

Figure 3:
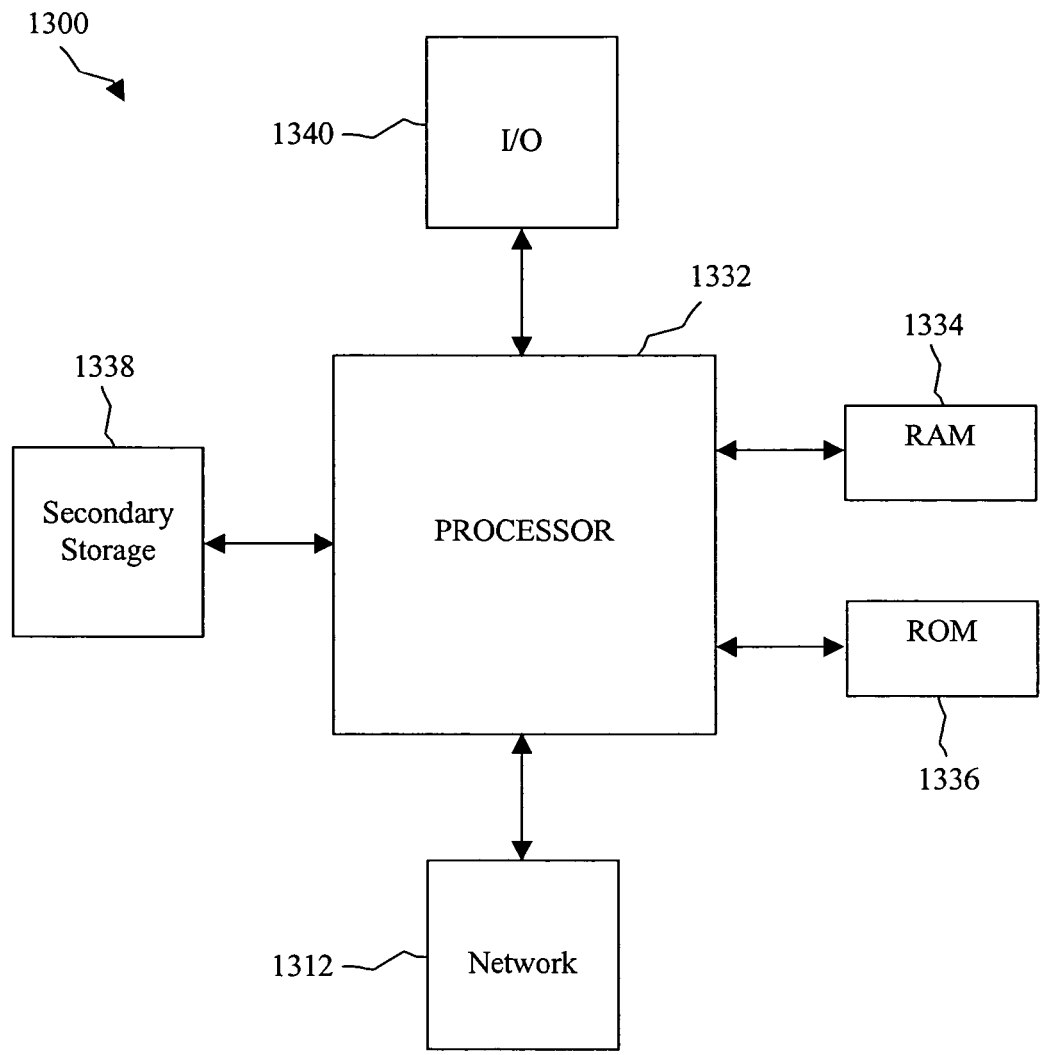
FIG. 3 is a block diagram of a computer system operable for some of the various embodiments of the present disclosure.

A postal address validation system as described above may generally be implemented on a variety of different computer systems. FIG. 3 illustrates a typical, general-purpose computer system suitable for implementing the present invention. The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that Postal Address Validation Using Mobile Telephone Location Information may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

What is claimed is:

1. A system for postal address validation using mobile device location data, comprising:
   a location system that monitors a location of a mobile device over a period of time to determine a set of mobile device location information based on an incorrect billing address for a customer; and
   a data store that stores customer information; and
   an address validation system coupled to the location system and configured to receive the set of mobile device location information and perform a plurality of functions, comprising:
      a first function of correlating location information with a postal address, wherein the address validation system performs the first function on the set of mobile device location information to obtain a plurality of postal addresses;
      a second function of analyzing the plurality of postal addresses to determine a new postal address that is most likely a residence of the customer; and
      a third function of updating the data store with the new postal address upon verification that the new postal address is the residence of the customer.

2. The system of claim 1, further comprising a computer-based client that defines a rule used by the second function of the address validation system to determine the new postal address that is most likely the residence of the customer.

3. The system of claim 2, wherein the rule includes time components used by the address validation system to determined the new postal address, the time components including a time of day component and a length of time component related to each mobile device location in the set of mobile device location information.

4. The system of claim 1, wherein the address validation system sends a message to the mobile device of the customer requesting the customer to confirm that the new postal address is a valid billing address, wherein the verification is provided when the customer confirms the new postal address is valid.

5. The system of claim 1, wherein a bill related to the mobile device is sent to the new postal address, and wherein the verification is provided if the bill is not returned by a postal service.

6. The system of claim 1, wherein the mobile device is selected from a group of mobile devices comprising mobile telephones, personal digital assistants, cellular phones, digital phone, radio devices, personal communications systems, mobile communications devices.

7. The system of claim 1, wherein the customer information stored in the data store includes billing addresses for customers and wherein the verification is provided through an assumption of correctness.

8. A method for identifying a likely billing address of a customer using location data, comprising:
   receiving a returned bill for service related to a mobile telephone due to an incorrect postal address;
   obtaining a set of location information from a location system based on receiving the returned bill for service, wherein the location information includes locations of the mobile telephone over a period of time;
   correlating each location in the set of location information with a corresponding postal address to generate a set of postal addresses;
   analyzing the set of postal addresses to determine the likely billing address for the customer of the mobile telephone; and
   updating a data store operable for maintaining customer address information with the likely billing address in response to a confirmation that the likely billing address is a correct billing address of the customer;
   sending a bill to the correct billing address.

9. The method of claim 8, further comprising requesting the customer to provide the confirmation.

10. The method of claim 8, further comprising sending a new bill to the likely billing address and inferring the confirmation if the new bill is not returned.

11. The method of claim 8, further comprising defining a rule used in the analysis to determine which postal address of the set of postal addresses is the likely billing address.

12. The method of claim 11, wherein the rule is based at least in part on a time of day that the mobile telephone is at each location in the set of location information.

13. The method of claim 11, wherein the rule is based at least in part on length of time that the mobile telephone is at each location in the set of location information.

14. The method of claim 8, further comprising, prior to collecting location information:
   determining whether the customer has elected to use a location-based service.

15. The method of claim 14, further comprising requesting that the customer to opt-in to the location-based service.

16. The method of claim 8, wherein the mobile telephone is selected from a group of mobile devices comprising personal digital assistants, cellular phones, digital phone, radio devices, personal communications systems, mobile communications devices.

17. The method of claim 8, wherein the bill is generated by a telecommunication billing system in communication with the data store.

18. The method of claim 8, wherein the location system receives the location information from the mobile telephone.

19. The method of claim 11, wherein the rule is based at least in part on days of the week that the mobile telephone is at each location in the set of location information.

20. The system of claim 1, wherein a message is sent to the mobile device of the customer requesting the customer to opt-in to a location-based service based on the incorrect billing address for the customer, wherein the location-based service is provided through the location system and the plurality of functions performed by the address validation system.

* * * * *